United States Patent [19]

Kodama

[11] Patent Number: 4,476,233
[45] Date of Patent: Oct. 9, 1984

[54] PHOSPHATE OPTICAL GLASS

[75] Inventor: Hiroyuki Kodama, Tokyo, Japan

[73] Assignee: Nippon Kogaku K.K., Tokyo, Japan

[21] Appl. No.: 531,410

[22] Filed: Sep. 12, 1983

[30] Foreign Application Priority Data

Oct. 6, 1982 [JP] Japan ................... 57-175668

[51] Int. Cl.$^3$ ............................... C03C 3/16
[52] U.S. Cl. ........................ 501/46; 501/44; 501/74; 501/903
[58] Field of Search ............ 501/903, 44, 46, 74

[56] References Cited

U.S. PATENT DOCUMENTS 3,068,108 12/1962 Geffcken .................. 501/903
3,836,375 9/1974 Broemer et al. ........... 501/903
4,108,673 8/1978 Toratani et al. ........... 501/903
4,261,751 4/1981 Nakamura et al. ......... 501/903

*Primary Examiner*—Mark Bell
*Attorney, Agent, or Firm*—Shapiro and Shapiro

[57] ABSTRACT

A phosphate optical glass comprises $P_2O_5$ of 40–55 weight percents, $R_2O$ of 20–40 weight percents (wherein R is an alkali metal or a mixture of alkali metals selected from the group consisting of Li, Na and K), $TiO_2$ of 8–20 weight percents, $WO_3$ of 1–12 weight percents (providing that the $WO_3$ content be less than $TiO_2$), $As_2O_3$ of 0.1–4 weight percents, MgO of 0–7, CaO of 0–11, BaO of 0–12, ZnO of 0–12 PbO of 0–18, $Nb_2O_5$ of 0–20, $Ta_2O_5$ of 0–10, $SiO_2$ of 0–3, $ZrO_2$ of 0–3, $La_2O_3$ of 0–3, $Y_2O_3$ of 0–3 and F of 0–5.

3 Claims, 1 Drawing Figure

PHOSPHATE OPTICAL GLASS

BACKGROUND OF THE INVENTION

1. Field of the Invention

The present invention relates to phosphate optical glass having improved characteristics in dispersion, transmission and chemical durability. More particularly, the present invention is directed to $P_2O_5$—$R_2O$ (alkali metal oxide) —$TiO_2$—$WO_3$ system optical glass having optical constants lying in the area defined and enclosed by seven points, A, B, C, D, E, F and G as shown in the accompanying drawing.

2. Description of the Prior Art

Among various kinds of optical glass there are known flint glass and heavy flint glass which belong to the group of high dispersion range. Conventionally a $SiO_2$—$R_2O$—$PbO$ system has been used for the preparation of flint or heavy flint glass. Although this type of glass is relatively high in dispersion, the dispersive power thereof is not yet so high as to be satisfactory (cf. marks "⊙" in the accompanying drawing, FIG. 1). In addition, this type of optical glass is deficient in chemical durability.

At present there is an increasing demand for such optical glass of further elevated dispersion which enables the lens designers to design higher quality lenses or to obtain further broadened freedom in lens design. In other words, the lens designers are now looking for a higher dispersion optical glass, that is, an optical glass having a higher dispersive power when optical glasses having the same refractive index are compared.

SUMMARY OF THE INVENTION

Accordingly the object of the present invention is to provide such optical glass which can meet the desire mentioned above.

To attain the object, the inventor of the present application has conducted vast studies and experiments on high dispersion optical glass. These studies have led to the finding that the glass composition as defined below provides an improved optical glass which is high in dispersion and transmission, and has good chemical durability, low liquid phase temperature and high stability against devitrification. Further, the glass can be prepared in mass production.

The subject of the present invention is a phosphate optical glass consisting essentially of:

| | |
|---|---|
| 40–55 (weight %) | $P_2O_5$, |
| 20–40 | $R_2O$, |
| (wherein R is an alkali metal or a mixture of alkali metals selected from the group consisting of Li, Na and K) | |
| 8–20 | $TiO_2$, |
| 1–12 | $WO_3$, |
| (providing that the $WO_3$ content be less than $TiO_2$) | |
| 0.1–4 | $As_2O_3$, |
| 0–7 | MgO, |
| 0–11 | CaO, |
| 0–12 | BaO, |
| 0–12 | ZnO, |
| 0–18 | PbO, |
| 0–20 | $Nb_2O_5$, |
| 0–10 | $Ta_2O_5$, |
| 0–3 | $SiO_2$, |
| 0–3 | $ZrO_2$, |
| 0–3 | $La_2O_3$, |
| 0–3 | $Y_2O_3$ and |
| 0–5 | F. |

The phosphate optical glass has optical constants ($n_d$ and $\nu_d$) lying within the area defined and enclosed by seven points, A(1.575, 37), B(1.625, 31), C(1.700, 26), D(1.700, 24), E(1.650, 25), F(1.580, 31) and G(1.550, 37) on the optical constant diagram of FIG. 1 wherein an arbitrary point X is represented by X ($n_d$, $\nu_d$).

The percentages of the respective components of the optical glass composition according to the invention have been determined based on experiments. The reasons for which the percentages of the components have been determined will hereinunder be described in detail.

$P_2O_5$ is a network forming oxide and allows a glass to melt and form at a lower temperature. It gives a glass having a higher transmittance over the range of from visible to near ultraviolet light. Therefore, at least 40 wt.% of $P_2O_5$ is necessary for the present optical glass. However, it has been found that the use of $P_2O_5$ more than 55 wt.% results in low refractive index and also poor chemical durability.

$R_2O$ (alkali metal oxide) has an effect to broaden the vitrification range and to lower the liquid phase temperature. It enables the melting of glass at low temperature and also reduces the problem of the glass being colored by the corrosion of the pot. Therefore, at least 20 wt.% of $R_2O$ is required for the present optical glass. However, when the content of this component exceeds 40 wt.%, the stability of the glass against devitrification is reduced thereby. Furthermore, the chemical durability is extremely degraded. The result of my experiments showed that a larger effect for improving the stability of glass could be obtained by the use of a mixture of alkali metal oxides than by an alkali metal oxide alone.

As for $TiO_2$ it has been found that less than 8 wt.% of the component makes it impossible to attain the desired refractive index and produces such glass having poor chemical durability. On the contrary, if the $TiO_2$ content is over 20 Wt.%, then difficulty arises in melting the glass material and there is produced a glass unstable against devitrification.

$WO_3$ is essential to lower the liquid phase temperature and to obtain good stability. This effect can be obtained only when the content of $WO_3$ is more than 1 wt.%. However, the use of $WO_3$ over 12 wt.% renders the glass colored. The content of $WO_3$ by weight percent should be smaller than $Tio_2$. Otherwise the stability of glass may be markedly reduced. Other disadvantages such as rising of the liquid phase temperature and coloring of the glass also may be caused thereby.

$As_2O_3$ has usually been used as a defoaming agent. For the manufacture of known common optical glasses this component is used as an arbitrary component. However, in the present invention, it is used as one of the essential components. When this system of glass according to the invention contains no $As_2O_3$, the glass is tinged with violet. For the optical glass according to the invention, therefore, $As_2O_3$ is essential to decolorize it. To this end, more than 0.1 wt.% of $As_2O_3$ is necessary. However, the use of too much of this component has an adverse effect. The stability against devitrification is reduced by it. Therefore, it should be used in an amount up to 4 wt.% and preferably up to 2 wt.%.

In addition to the above essential components, the glass composition according to the invention may include, as arbitrary components, alkaline earth metal oxide or oxides, ZnO, PbO, $Nb_2O_5$, $Ta_2O_5$, $ZrO_2$, $La_2O_3$, $Y_2O_3$, $SiO_2$, F and the like.

The addition of alkaline earth metal oxide or oxides has an effect to further broaden the vitrification range and also to lower the melting temperature of the raw material mixture of the glass. Furthermore, it serves to prevent the glass from being colored or contaminated by the corrosion of the pot. However, when too much is used, the dispersion of the glass is reduced and it is impossible to obtain the desired high dispersion optical glass. For this reason, the amount of BaO, if it is added to the glass composition of the present invention, should be up to 12 wt.%. For the same reason, the amount of CaO should be up to 11 wt.% and that of MgO be up to 7 wt.%.

ZnO has been found to be effective to further improve the stability against devitrification. However, the use of this arbitrary component over 12 wt.% reduces the dispersion of the glass to the extent that the desired highly dispersive glass is no longer obtainable. In addition, the glass is rendered easily devitrifiable.

PbO is poisonous to the human body and therefore it is advisable to avoid the use of PbO in the glass composition. However, it has particular effects to give a small Abbe's number to the glass for its refractive index, to broaden the vitrification range and to lower the liquid phase temperature. For these merits, if it is wished, PbO may be added to the glass composition in an amount up to 18 wt.%. Addition of PbO over 18 wt.% causes the problems of lowering the viscosity and strong coloring of the glass.

$Nb_2O_5$ has been found to be effective to further improve the dispersion of the glass. Therefore, it may added to the glass composition of the present invention. However, the addition of this arbitrary component should be limited to 20 wt.% at the most. Otherwise the glass will be strongly colored thereby.

$Ta_2O_5$ has an effect to increase the refractive index as well as the dispersion of the glass. However, the addition of $Ta_2O_5$ more than 10 wt.% brings about adverse effects to the liquid phase temperature and the stability against devitrification.

Addition of $SiO_2$ has an effect to increase the viscosity of the glass which in turn has an effect to improve the stability against devitrification. However, if it is added in an amount more than 3 wt.%, unmelted matter is easily formed during melting and it becomes difficult to obtain a homogeneous glass.

$ZrO_2$, $La_2O_3$ and $Y_2O_3$ have been found to be effective to improve the chemical durability and the transmission of the glass so long as the content of these arbitrary components is not more than 3 wt.%. Higher content than 3 wt.% is not desirable because it raises the liquid phase temperature and increases the tendency to devitrification.

Fluorine (F) has an effect to further improve the dispersion of the optical glass according to the invention. In some cases, the addition of F has been found to be effective also to lower the liquid phase temperature and to increase the transmission to rays of light. However, if it is added, the content of F in the glass composition of the present invention should be limited to 5 wt.% at the most. Otherwise there takes place a vigorous evaporation of fluorine and/or fluorine compound during the process of glass melting which will change the optical properties of the produced glass and also easily form striae in the glass.

Within the scope of the present invention the following glass composition is preferred because of higher stability against devitrification, lower liquid phase temperature and less coloring contamination by the pot:

| Range | Component |
|---|---|
| 40–55 (wt. %) | $P_2O_5$, |
| 20–40 | $R_2O$, |
| (wherein R has the same meaning as the above) | |
| 8–17 | $TiO_2$, |
| 1–12 | $WO_3$, |
| (providing that the percentage of $WO_3$ be not more than $TiO_2$) | |
| 0.1–2 | $As_2O_3$, |
| 0–5 | MgO, |
| 0–8 | CaO, |
| 0–9 | BaO, |
| 0–9 | ZnO, |
| 0–9 | PbO, |
| 0–9 | $Nb_2O_5$, |
| 0–5 | $Ta_2O_5$, |
| 0–3 | $SiO_2$, |
| 0–3 | $ZrO_2$, |
| 0–3 | $La_2O_3$, |
| 0–3 | $Y_2O_3$ and |
| 0–5 | F. |

Under the above defined preferred glass composition, the following glass composition is particularly preferred for its further higher stability against devitrification as well as further higher light transmission and chemical durability:

| Range | Component |
|---|---|
| 40–55 (wt. %) | $P_2O_5$, |
| 20–40 | $R_2O$, |
| (wherein R has the same meaning as the above) | |
| 10.5–17 | $TiO_2$, |
| 4–12 | $WO_3$, |
| (providing that the percentage of $WO_3$ be not more than $TiO_2$) | |
| 0.1–2 | $As_2O_3$, |
| 0–4 | MgO, |
| 0–6 | CaO, |
| 0–9 | BaO, |
| 0–9 | ZnO, |
| 0–9 | PbO, |
| 0–9 | $Nb_2O_5$, |
| 0–5 | $Ta_2O_5$, |
| 0–2 | $SiO_2$, |
| 0–2 | $ZrO_2$, |
| 0–2 | $La_2O_3$, |
| 0–2 | $Y_2O_3$ and |
| 0–2 | F. |

The optical glass according to the invention can be manufactured employing the conventional glass manufacturing process.

As the raw materials of the respective necessary components there may be used materials known per se for the purpose. As for the component $P_2O_5$ there is used an aqueous solution of orthophosphate ($H_3PO_4$) or phosphate of another component such as sodium metaphosphate or calcium pyrophosphate. As for other components there may be used oxides, carbonates, nitrates or fluorides of the respective elements. These materials are weighed out and then mixed together into a formulated raw material mixture. The mixture is brought into a melting furnace heated at 1000°–1200° C. in which the mixture is melted, clarified, stirred and homogenized. Thereafter, the melted mass is cast into a die. After annealing there is obtained the desired glass.

BRIEF DESCRIPTION OF THE DRAWING

The accompanying single FIGURE.

DESCRIPTION OF PREFERRED EMBODIMENTS

Figure 1:
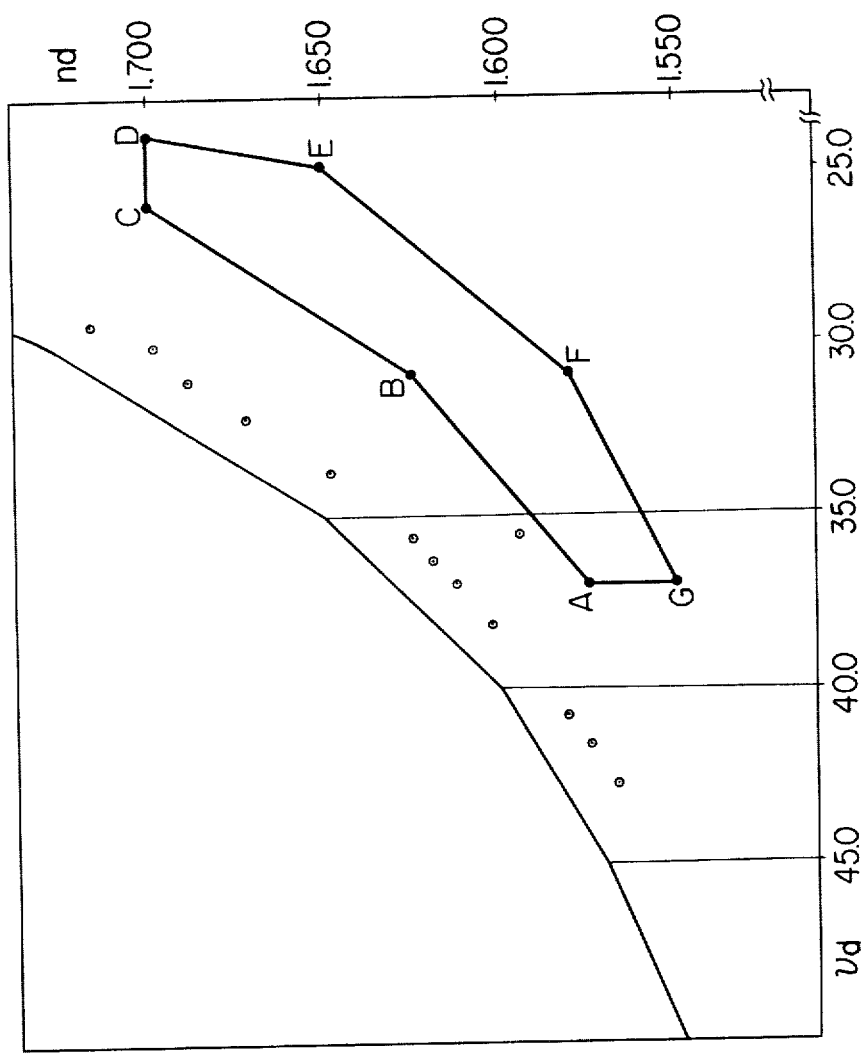
FIG. 1 is an optical glass $n_d$-$\nu_d$ diagram in which examples of the optical glass according to the invention are denoted by "." and examples of conventional flint and heavy flint glass by "⊙".

Preferred embodiments of the optical glass according to the present invention are shown in the following table, Table 1 in which the content of every component is given in percent by weight, and $n_d$ denotes refractive index and $\nu_d$ is Abbe's number.

TABLE 1

| Component | No. 1 | No. 2 | No. 3 | No. 4 | No. 5 | No. 6 | No. 7 | No. 8 | No. 9 | No. 10 |
|---|---|---|---|---|---|---|---|---|---|---|
| $P_2O_5$ | 47.90 | 50.15 | 45.45 | 50.00 | 45.85 | 52.35 | 45.11 | 51.30 | 44.45 | 43.15 |
| $Na_2O$ | 21.70 | 28.80 | 13.80 | 22.60 | 20.75 | 24.05 | 20.41 | 23.20 | 20.15 | 19.55 |
| $K_2O$ | 9.35 |  | 19.70 | 9.35 | 9.35 | 9.33 | 9.33 | 9.35 | 9.35 | 9.35 |
| $TiO_2$ | 13.00 | 13.00 | 13.00 | 10.00 | 16.00 | 12.97 | 13.47 | 8.10 | 18.00 | 19.90 |
| $WO_3$ | 7.85 | 7.85 | 7.85 | 7.85 | 7.85 | 1.10 | 11.48 | 7.85 | 7.85 | 7.85 |
| $As_2O_3$ | 0.20 | 0.20 | 0.20 | 0.20 | 0.20 | 0.20 | 0.20 | 0.20 | 0.20 | 0.20 |
| $n_d$ | 1.605260 | 1.603810 | 1.603570 | 1.579710 | 1.629940 | 1.583310 | 1.617090 | 1.565320 | 1.645280 | 1.663220 |
| $\nu_d$ | 30.79 | 31.08 | 30.73 | 34.04 | 28.34 | 32.26 | 29.98 | 36.47 | 26.99 | 25.83 |

| Component | No. 11 | No. 12 | No. 13 | No. 14 | No. 15 | No. 16 | No. 17 | No. 18 | No. 19 | No. 20 |
|---|---|---|---|---|---|---|---|---|---|---|
| $P_2O_5$ | 51.10 | 46.90 | 45.85 | 43.95 | 40.77 | 40.95 | 40.95 | 40.95 | 40.95 | 40.42 |
| $Na_2O$ | 27.85 | 32.05 | 11.00 | 19.65 | 18.01 | 18.65 | 18.65 | 18.65 | 18.65 | 18.36 |
| $K_2O$ |  |  | 22.10 | 9.35 | 9.54 | 9.35 | 9.35 | 9.35 | 9.35 | 8.73 |
| $TiO_2$ | 13.00 | 13.00 | 13.00 | 13.00 | 13.27 | 13.00 | 13.00 | 13.00 | 13.00 | 19.96 |
| $WO_3$ | 7.85 | 7.85 | 7.85 | 7.85 | 8.01 | 7.85 | 7.85 | 7.85 | 7.85 | 7.83 |
|  |  |  |  | MgO 6.00 | CaO 10.20 | BaO 10.00 | ZnO 10.00 | PbO 10.00 | $Nb_2O_5$ 10.00 | $K_2TiF_6$ 4.50 |
| $As_2O_3$ | 0.20 | 0.20 | 0.20 | 0.20 | 0.20 | 0.20 | 0.20 | 0.20 | 0.20 | 0.20 |
| $n_d$ | 1.604830 | 1.597070 | 1.598810 | 1.612050 | 1.617610 | 1.626910 | 1.629600 | 1.643340 | 1.650230 | 1.666660 |
| $\nu_d$ | 30.92 | 32.26 | 31.24 | 32.49 | 31.74 | 30.72 | 30.56 | 28.54 | 28.41 | 27.00 |

| Component | No. 21 | No. 22 | No. 23 | No. 24 |
|---|---|---|---|---|
| $P_2O_5$ | 35.43 | 34.13 | 40.58 | 43.41 |
| $Na_2O$ | 16.77 | 16.47 | 18.02 | 19.90 |
| $K_2O$ | 6.34 | 5.94 | 7.93 | 8.34 |
| $TiO_2$ | 12.97 | 12.97 | 12.97 | 13.00 |
| $WO_3$ | 7.83 | 7.83 | 7.83 | 7.85 |
| $K_2TiF_6$ | 4.49 | 4.49 | 4.49 | 4.50 |
|  | PbO 15.97 | $Nb_2O_5$ 17.97 | $Ta_2O_5$ 7.98 |  |
| $As_2O_3$ | 0.20 | 0.20 | 0.20 | 3.00 |
| $n_d$ | 1.675780 | 1.699610 | 1.640100 | 1.617540 |
| $\nu_d$ | 26.36 | 25.00 | 28.26 | 29.36 |

As readily understood from the foregoing, the present invention provides improved high dispersion optical glass useful for various optical parts and elements such as lenses and prisms.

I claim:

1. A phosphate optical glass having the optical constants lying in the area defined and enclosed by the seven points, A, B, C, D, E, F and G as shown in the accompanying drawing and consisting essentially of, by weight percent,

| 40–55 | $P_2O_5$, |
|---|---|
| 20–40 | $R_2O$, (wherein R is Li, Na or K) |
| 8–20 | $TiO_2$, |
| 1—12 | $WO_3$, |

(providing that the percentage of $WO_3$ be not larger than $TiO_2$)

| 0.1–4 | $As_2O_3$, |
|---|---|
| 0–7 | MgO, |
| 0–11 | CaO, |
| 0–12 | BaO, |
| 0–12 | ZnO, |
| 0–18 | PbO, |
| 0–20 | $Nb_2O_5$, |
| 0–10 | $Ta_2O_5$, |
| 0–3 | $SiO_2$, |
| 0–3 | $ZrO_2$, |
| 0–3 | $La_2O_3$, |
| 0–3 | $Y_2O_3$ and |
| 0–5 | F. |

2. A phosphate optical glass according to claim 1, which consisting essentially of, by weight percent,

| 40–55 | $P_2O_5$, |
|---|---|
| 20–40 | $R_2O$, |
| 8–17 | $TiO_2$, |
| 1–12 | $WO_3$, |

(providing that the percentage of $WO_3$ be not larger than $TiO_2$),

| 0.1–2 | $As_2O_3$, |
|---|---|
| 0–5 | MgO, |
| 0–8 | CaO, |
| 0–9 | BaO, |
| 0–9 | ZnO, |
| 0–9 | PbO, |
| 0–9 | $Nb_2O_5$, |
| 0–5 | $Ta_2O_5$, |
| 0–3 | $SiO_2$, |
| 0–3 | $ZrO_2$, |
| 0–3 | $La_2O_3$, |
| 0–3 | $Y_2O_3$ and |
| 0–5 | F. |

3. A phosphate optical glass according to claim 1, which consisting essentially of, by weight percent,

| | |
|---|---|
| 40–55 | $P_2O_5$, |
| 20–40 | $R_2O$, |
| 10.5–17 | $TiO_2$, |
| 4–12 | $WO_3$, |
| (providing that the percentage of $WO_3$ be not larger than $TiO_2$) | |
| 0.1–2 | $As_2O_3$, |
| 0–4 | MgO, |
| 0–6 | CaO, |
| 0–9 | BaO, |
| 0–9 | ZnO, |
| 0–9 | PbO, |
| 0–9 | $Nb_2O_5$, |
| 0–5 | $Ta_2O_5$, |
| 0–2 | $SiO_2$, |
| 0–2 | $ZrO_2$, |
| 0–2 | $La_2O_3$, |
| 0–2 | $Y_2O_3$ and |
| 0–2 | F. |

* * * * *